US012553850B2

United States Patent
Wu et al.

(10) Patent No.: US 12,553,850 B2
(45) Date of Patent: Feb. 17, 2026

(54) SENSOR ASSEMBLY AND METHOD (71) Applicant: Analog Devices International Unlimited Company, Limerick (IE)

(72) Inventors: Joyce Wu, Cambridge, MA (US); Junfei Xia, Andover, MA (US); Helen Berney, Limerick (IE); David Duncan Lloyd, Menlo Park, CA (US)

(73) Assignee: Analog Devices International Unlimited Company, Limerick (IE)

( * ) Notice: Subject to any disclaimer, the term of this patent is extended or adjusted under 35 U.S.C. 154(b) by 328 days.

(21) Appl. No.: 18/194,117

(22) Filed: Mar. 31, 2023

(65) Prior Publication Data

US 2024/0328988 A1     Oct. 3, 2024

(51) Int. Cl.
*G01N 27/327*     (2006.01)
*B01L 3/00*     (2006.01)
*C12Q 1/6825*     (2018.01)

(52) U.S. Cl.
CPC .... *G01N 27/3276* (2013.01); *B01L 3/502761* (2013.01); *C12Q 1/6825* (2013.01); *G01N 27/3278* (2013.01); *B01L 2200/0647* (2013.01); *B01L 2300/0645* (2013.01); *B01L 2400/043* (2013.01)

(58) Field of Classification Search
CPC ............ G01N 27/3276; G01N 27/3278; B01L 3/502761; B01L 2200/0647; B01L 2300/0645; B01L 2400/043
See application file for complete search history.

(56) References Cited

U.S. PATENT DOCUMENTS 8,778,666 B1    7/2014   Chung et al.
2007/0154909 A1*   7/2007   Xiao .................. G01N 27/3277
                                                                                                                                                                  435/6.15

FOREIGN PATENT DOCUMENTS

WO          2020/197554 A1    10/2020
WO       WO-2022093949 A1 *   5/2022  ......... B01F 33/3038

OTHER PUBLICATIONS

Redbud Labs MXR microfluidic mixing chip.
AC Electric-Field-Induced Fluid Flow in Microelectrodes (Journal of Colloid and Interface science 217, 420-422).
Importance of the Debye Screening Length on Nanowire Field Effect Transistor Sensors (National Library of Medicine) Eric Stern et al.
Beyond the Debye length in high ionic strength solution: direct protein detection with field-effect transistors (FETs) in human serum (Scientific reports nature portfolio Jul. 12, 2017) Chai-Ho Chu et al.
Going beyond the Debye Length: Overcoming Charge Screening Limitations in Next-Generation Bioelectronic Sensors (ACS Nano) Vladimir Kesler et al.

(Continued)

*Primary Examiner* — C. Sun
(74) *Attorney, Agent, or Firm* — ArentFox Schiff LLP (57) ABSTRACT

The present disclosure provides sensor assemblies comprising a plurality of mixing species provided adjacent or on the sensing surface, wherein each mixing species comprises a polynucleotide chain and wherein each mixing species is anchored to the sensor assembly; and an actuation unit configured to move at least a part of each mixing species in a plurality of directions. Alternatively or additionally, the polynucleotide chain comprises DNA and has a length of at least 10 nm.

22 Claims, 5 Drawing Sheets

(56) References Cited

OTHER PUBLICATIONS

Polymer Brushes (SC Organic Surface Chemistry Aarhus University, Denmark).
Popescu Mihail N et al: "Analyte Sensing with Catalytic Micromotors"; Biosensors, vol. 13, No. 1, Dec. 28, 2022 (Dec. 28, 2022), p. 45.
De Vellis et al: "Drastic Sensing enhancement Using Acoustic Bubbles for Surface-Based Microfluidic Sensors", Sensors and Actuators B:Chemica, May 29, 2027(May 29, 2017).
Moeto Nagai et al: "Active Mixing in Microchamber using Cilia of Vorticella Convallaria", IEEJ Transactions on Electrical and Electronic Engineering, John Wiley & Sons, Inc, US, vol. 9, No. 5, Jun. 2, 2014 (Jun. 2, 2014), pp. 575-576.
International Search Report issued in corresponding International Application No. PCT/EP2024/058050 dated Jul. 3, 2024.

* cited by examiner

SENSOR ASSEMBLY AND METHOD

FIELD OF THE DISCLOSURE

This disclosure relates to a sensor assembly for determining a property of a sample, for example for sensing a property of an analyte in a sample, and a method for determining a property of a sample.

BACKGROUND

Various biological and chemical assays are known for sensing analytes. Analytes may, for example, include biomarkers, such as hormones, proteins, enzymes, nucleic acids, cells, etc., established to assist in patient monitoring and/or diagnosis.

Many of these assays are now carried out using electrical sensors, such as electrochemical sensors. For example, some traditional sensors in these fields use sensing elements, such as those with sensing surfaces, which have immobilized capture species provided thereon. These are typically provided on the surfaces of the sensing elements through covalent chemical linkage, covalent-like interactions (e.g. chemisorption of anchor species onto the surface through chemical bond formation) and non-covalent-like interactions (e.g. physisorption of anchor species onto the surface through weaker, often van der Waals, interactions) depending on the identity of the surface and the anchor species.

Measurement using electrical sensors can be slow. Specifically, in most systems, transport of the targets to the sensing surfaces (for example, for binding to a capture species) is primarily achieved by diffusion of the targets (e.g. an analyte) in the sample fluid. This diffusion is usually the rate determining step in the measurement. Incubation times (i.e. the period waiting for transport) can be several minutes, and in some cases much longer (e.g. 30 minutes). The same is also true for optical sensors and other conventional assays, such as plate-based assays. It would be advantageous to increase measurement speeds, which would in turn improve the use possibilities (such more point-of-care testing).

SUMMARY OF THE DISCLOSURE

The present disclosure provides sensor assemblies, systems and methods for determining a property of an analyte in a sample, where sensor assemblies comprise (and the systems and methods use a sensor assembly comprising) a plurality of mixing species provided adjacent or on the sensing surface, wherein each mixing species comprises a polynucleotide chain and wherein each mixing species is anchored to the sensor assembly; and an actuation unit configured to move at least a part of each mixing species in a plurality of directions. Alternatively or additionally, the polynucleotide chain comprises DNA and has a length of at least 10 nm.

In a first aspect, a sensor assembly for determining a property of a sample comprises: a sensing surface for providing a signal indicative of a property of a sample; relative to the sensing surface by applying a force to the mixing species so as to mix sample adjacent to or on the sensing surface.

In a second aspect, a sensor assembly for determining a property of a sample comprises a sensing surface for providing a signal indicative of a property of a sample; a plurality of mixing species provided adjacent or on the sensing surface, wherein each mixing species comprises a polynucleotide chain, wherein each mixing species is anchored to the sensor assembly, wherein the polynucleotide chain comprises DNA and wherein the mixing species has a length of at least 10 nm; and an actuation unit configured to move at least a part of each mixing species relative to the sensing surface by applying a force to the mixing species so as to mix sample adjacent to or on the sensing surface.

In a third aspect, a method of determining a property of sample comprises: providing a sensor assembly comprising a sensing surface for providing a signal indicative of a property of a sample and a plurality of mixing species provided adjacent or on the sensing surface, wherein each mixing species comprises a polynucleotide chain and wherein each mixing species is anchored to the sensor assembly; providing a sample to the sensing surface; moving at least a part of each mixing species in a plurality of directions relative to the sensing surface by applying a force to the mixing species so as to mix sample adjacent to or on the sensing surface; obtaining a measurement signal based on the interaction of the sample with the sensing surface; and determining the property of the sample based on the measurement signal.

BRIEF DESCRIPTION OF THE DRAWINGS

The present invention will now be described in more detail with reference to the accompanying drawings, which are not intended to be limiting.

DETAILED DESCRIPTION

Electrochemical sensors, including biosensors and chemisensors, are used for various biological and chemical assay are known for sensing analytes in samples. Analytes may, for example, include biomarkers, such as hormones, established to assist in patient monitoring and/or diagnosis.

Measurement using electrical (e.g. electrochemical) sensors can be slow. Transport of the targets to the sensing surfaces (for example, for binding to a capture species) can be slow and is primarily achieved by diffusion of the targets (e.g. an analyte) in the sample fluid toward the sensing surface. This diffusion is usually the rate determining step in the measurement. Incubation times (i.e. the period waiting for transport) can be several minutes, and in some cases much longer (e.g. 30 minutes). It would be advantageous to increase measurement speeds, which would in turn improve the use possibilities (such more point-of-care testing).

In a first aspect, a sensor assembly for determining a property of a sample comprises: a sensing surface for providing a signal indicative of a property of a sample; a plurality of mixing species provided adjacent or on the sensing surface, wherein each mixing species comprises a polynucleotide chain and wherein each mixing species is anchored to the sensor assembly; and an actuation unit configured to move at least a part of each mixing species in a plurality of directions relative to the sensing surface by applying a force to the mixing species so as to mix sample adjacent to or on the sensing surface.

Embodiments provide a sensor assembly which can reduce measurement time by increasing the interaction between the targets of interest and the sensing surface. Specifically, by providing a mixing species adjacent (i.e. next to or abutting) or on the sensing surface and causing this to mix fluid on the sensing surface, this can provide molecule-scale (e.g. nanoscale) disruption of the fluid at the sensing surface thereby increasing movement of species in the sample and encouraging migration. This can cause migration of targets of interest to the sensing surface more quickly than diffusion alone and can cause movement of other species (e.g. non-selectively binding species) away from the sensing surface more quickly. Moreover, the localised movement on the sensing surface can provide advantages over macro-level mixing of the bulk, which still rely on diffusion at the sensing surface level. As such, this can reduce the time of or reduce the need for an incubation period.

Embodiments also advantageously can increase the sensitivity of the sensing surface to target analytes. Without wishing to be bound by theory, it is thought that mixing using the mixing species can alter or disrupt the electric double layer on the sensing surface and thereby increasing the Debye length ($\lambda_D$), or at the least reduce the influence of the electric double layer. The Debye length ($\lambda_D$) is the length outside of which charges are not sensed due to screening by ions in the electrolyte (which form the electric double layer). In an electrolytic solution such as phosphate buffered saline (PBS) or blood, the Debye length can be of the order of 1 nm. This can be problematic since many capture species have a length>>1 nm (e.g. aptamers or antibodies). The Debye length can be increased by changing electrolyte conductivity, using AC voltage, pulses, shaped electrode; however, improvements can still be made. Mixing using molecular-scale (e.g. nano-scale) mixing species causes disruption of the electric double layer thereby reducing the interference caused by the ions. This is particularly the case for a mixing species with a polynucleotide chain, which has a strong electrostatic charge (negative charge). This effect is also beneficial over existing convention-relating techniques (e.g. which rely on flow or macro-level mixing).

Polynucleotide chains are particularly effective as a part or the whole of a mixing species. As noted above, polynucleotides are strongly electrostatically charged and therefore can be used to disrupt the electric double layer formed on the sensing surface. The charged nature also means that these have a larger hydrodynamic radius, increasing the effect of the mixing (i.e. the fluid which is displaced by movement of the mixing species). This property also enables easy manipulation of the mixing species, for example using an electric field. Moreover, polynucleotide chains are particularly advantageous from the perspective of fabrication of the sensor assemblies. Polynucleotides are biocompatible and can be bound to surfaces, such as the sensing surface, relatively easily and with accurate control over density and spacing, thereby enabling them to be fixed in place and provide mixing in the desired regions. The polynucleotide chain can also be modified and customised in a relatively straightforward manner by increasing or decreasing the number of nucleotides (nt), for example the number of base pairs (bp). The customisability extends to create anchor points for other functional species or motifs, such as proteins, nanoparticles, beads or branches of other polynucleotide chains (e.g. ds-DNA). This can provide flexibility in design and mixing effect.

Moreover, the structure of polynucleotides is particularly suited for mixing as the chains tend to be rigid but while still retaining some flexibility (i.e. they are not stiff). This means that when the force is applied, rather than simply moving as a rigid rotor, they instead create a whipping or thrashing motion which can increase turbulence and therefore the mixing effect.

In a second aspect, a sensor assembly for determining a property of a sample comprises a sensing surface for providing a signal indicative of a property of a sample; a plurality of mixing species provided adjacent or on the sensing surface, wherein each mixing species comprises a polynucleotide chain, wherein each mixing species is anchored to the sensor assembly, wherein the polynucleotide chain comprises DNA (e.g. double-stranded DNA and/or single-stranded DNA) and wherein the mixing species has a length of at least 10 nm; and an actuation unit configured to move at least a part of each mixing species relative to the sensing surface by applying a force to the mixing species so as to mix sample adjacent to or on the sensing surface. The advantageous and embodiments set out herein apply equally to the second aspect as the first aspect.

Mixing Species

The mixing species are "adjacent or on" the sensing surface. Adjacent can include next or near, but also adjoining, abutting or on. In some embodiments, the mixing species is provided on the sensing surface, for example, these may be bound to the sensing surface. In some embodiments, the sensing surface is functionalized with the mixing species. Such functionalization can be achieved in any suitable manner, such as by covalently or non-covalently immobilizing the capture species to the surface. Accordingly, in some embodiments, the mixing species is adhered or anchored on the sensing surface.

The mixing species comprises a polynucleotide chain. In some embodiments, the mixing species is formed of (i.e. is exclusively a) polynucleotide chain (only). In other embodiments, the mixing species comprises other components in addition to the polynucleotide chain, as set out in more detail below. By "polynucleotide chain" it is meant that it comprises an elongated polynucleotide or nucleic acid moiety. These are polymers comprising nucleotides (e.g. deoxyribonucleotides or ribonucleotides) and comprise at least 2 nucleotides (nt) (or bases) in a chain. In some embodiments, the polynucleotide comprises at least 10 nucleotides (nt), such as at least 13 nt, at least 15 nt, at least 20 nt along the length. In some embodiments, these may comprise at least 50 nt or at least 200 nt. In some embodiments, this may be 2 nt to 1000 nt, such as 2 nt to 900 nt, 2 nt to 500 nt, 10 nt to 1000 nt, 10 nt to 500 nt or 15 nt to 500 nt. In some embodiments, the polynucleotide chain is an oligonucleotide chain, e.g. having 10 nt or greater (e.g. up to 300 nt). There the polynucleotide chain comprises plural parallel chains of nucleotides (e.g. as a double stranded nucleotide), the length refers to a single chain such that as "at least 10 nt" (or similar) refers to at least 10 nt along the length of one chain, which would be equivalent in DNA to "at least 10 base pairs". Thus, 2 nt to 1000 nt may for DNA be 2 bp to 1000 bp. In a non-limiting example, the polynucleotide chain may comprise or be formed of ribonucleotide monomers (i.e., may be oligoribonucleotides) and/or deoxyribonucleotide monomers (i.e., may be oligodeoxyribonucleotides).

In some embodiments, the polynucleotide chain comprises or is formed of at least one of deoxyribonucleic acid (DNA), or ribonucleic acid (RNA). In some embodiments, the polynucleotide chain is formed of deoxyribonucleic acid (DNA) or ribonucleic acid (RNA). DNA can include single-stranded DNA (ss-DNA) and/or double-stranded DNA (ds-DNA). This can include origami DNA and/or self-assembling DNA nanostructures, in any suitable structure. In some embodiments, the polynucleotide chain comprises or is formed of at least one of ss-DNA or ds-DNA, and may include both.

In some embodiments, the polynucleotide chain comprises or is formed of a double-stranded nucleotide, such as ds-DNA. Double-stranded nucleotides can form double helix structures. Such double-stranded structures can advantageously provide a balance between rigidity and flexibility (it is rigid, but not stiff) so that improved turbulence can be provided. In particular, it can be regarded as stacked discs which are interconnected by a bending and torsion spring, which are modelled in "Effects of Different Cations on the Hydrodynamic Radius of DNA" Fujimoto et. Al Biophysical Journal Vol. 67, July 1994 304-308, the contents of which is incorporated herein by reference. Moreover, these are relatively highly electrostatically charged permitting manipulation, for example in an electric field or by alternating attraction and repulsion forces. Moreover, the structure enables it to return to an upright position easily, for example when the actuation is not active (e.g. the force is not applied). In some embodiments, the polynucleotide chain comprises or is formed of a double-stranded nucleotide with a length of at least 10 base pairs (bp), such as at least 13 bp, at least 15 bp, at least 20 bp along the length. Polynucleotide chains comprising or formed of ds-DNA may, in embodiments, have a maximum length of 1000 bp, such as less than or equal to 900 bp, less than or equal to 500 bp, or less than or equal to 200 bp. In some embodiments, this may be 20 bp to 1000 bp, such as 20 bp to 900 bp, 24 bp to 500 bp, 24 bp to 1000 bp, 24 bp to 500 bp or 24 bp to 500 bp.

In some embodiments, the polynucleotide chain comprises or is formed of ds-DNA. Ds-DNA can include A-DNA, B-DNA and Z-DNA. For ds-DNA, although longer structures are possible and can be stable, less than or equal to 900 base provides a balance of rigidity and flexibility and without excessive (or any) folding or bunching which may otherwise hinder the binding process. Moreover, ds-DNA is highly charged enabling manipulation, is biocompatible and lends itself to biosensor and chemisensors manufacturing processes.

In some embodiments, the polynucleotide chain may be comprised of or formed of a mixture of polynucleotides, such as both single-stranded DNA (ss-DNA) or double-stranded DNA (ds-DNA). This can provide regions of differing flexibility, permitting different mixing motions. For example, a relatively rigid (but still flexible) ds-DNA strand may be joined to a more flexible ss-DNA strand.

In some embodiments comprising a double stranded polynucleotide chain (e.g. DNA or RNA), the chain comprises a GC-content (i.e. a percentage of the nucleotide chain defined by G or C base pairs) is at least 20%, such as at least 25%, at least 35%. In some embodiments, this is 20% to 80%, such as 25% to 75%. This can contribute to improved stability of the chain.

Stability of a double stranded polynucleotide chain can be measured by melting temperature and monitoring separation of the chains using spectrophotometry. In embodiments, the ds-polynucleotide chain has a minimum melting temperature of at least 30 degrees, such as at least 37 degrees, such as at least 50 degrees, as determined by any suitable melting point test for nucleotide chains, for example optical-based melting point tests monitoring absorbance at 260 nm. If the mixing species comprises RNA, a sample pre-treatment step may be needed, such as to remove RNAase.

In some embodiments, the mixing species has a length of at least 10 nm, in some embodiments from 10 nm to 10 µm, such as from 10 nm to 5 µm, 10 nm to 1000 nm, 10 nm to 500 nm, 10 nm to 350 nm, 10 nm to 300 nm or 10 nm to 150 nm. This is the longest length of the mixing species, for example as can be measured from the point at which the mixing species is anchored to the sensor assembly (e.g. the sensor surface) to the further part of the mixing species from the point at which it is anchored. For example, where the mixing species is an elongated body, this may be along the elongate length. In some embodiments, the mixing species has a length of at least 15 nm, such as 15 nm to 1000 nm, 15 nm to 500 nm, 15 nm to 350 nm, 15 nm to 300 nm, or 15 nm to 150 nm. In some embodiments, the mixing species has a length of at least 25 nm, such as 25 nm to 1000 nm, 25 nm to 500 nm, 25 nm to 350 nm, 25 nm to 300 nm, or 25 nm to 150 nm. These lengths provide a good balance of flexibility and maneuverability and therefore provide turbulence. Actuation may be tailored based on length to provide appropriate movement and mixing. Longer mixing species may be made up of plural parts, such as polynucleotide chain(s) with other species, such as antibodies, in the mixing species.

In some embodiments, the polynucleotide chain has a length of at least 10 nm, in some embodiments from 10 nm to 1000 nm, such as 10 nm to 1000 nm, 10 nm to 500 nm, 10 nm to 350 nm, 10 nm to 300 nm or 10 nm to 150 nm. This is the longest length of the polynucleotide chain, for example as can be measured from the first nucleotide or base pair of the chain to the nucleotide or base pair which is furthest from the first nucleotide. For example, where the polynucleotide chain is an elongated polynucleotide chain, this may be along the elongate length. In some embodiments, the polynucleotide chain has a length of at least 15 nm, such as 15 nm to 1000 nm, 15 nm to 500 nm, 15 nm to 350 nm, 15 nm to 300 nm, or 15 nm to 150 nm. In some embodiments, the polynucleotide chain has a length of at least 25 nm, such as 25 nm to 1000 nm, 25 nm to 500 nm, 25 nm to 350 nm, 25 nm to 300 nm, or 25 nm to 150 nm. These lengths provide a good balance of flexibility and maneuverability and therefore provide turbulence. Actuation may be tailored based on length to provide appropriate movement and mixing.

As set out above, in some embodiments, each mixing species is anchored to the sensing surface. In some embodiments, each mixing species comprises an anchor portion which anchors the mixing species to the sensing surface. By anchor portion it is meant that a part of the mixing species is used to adhere the mixing species to the sensing surface. For example, this may be a part of the mixing species which is covalently bonded to the sensing surface. In some embodiments, the polynucleotide chain forms the anchor portion, such that the polynucleotide chain is bound or adhered to the sensing surface (e.g. covalently bonded to the surface). This anchoring may be directly or indirectly with the sensing surface. Embodiments in which the polynucleotide chain comprises the anchor portion (e.g. the polynucleotide chain is the anchor) can be advantageous as connecting such chains to sensing surfaces (e.g. electrodes) provides a strong yet flexible connection and can be carried out using established anchoring techniques.

In some embodiments, each mixing species comprises an elongate body, the elongate body comprising the polynucleotide chain; and wherein the elongate body comprises a first flexible region and a first rigid region, the first rigid region having a flexibility less than the first flexible region. This relatively flexibility can be provided by different parts of the polynucleotide chain, for example. For example, in some embodiments, this may comprise ds-DNA providing the relatively rigid first rigid section and ss-DNA providing the relatively flexible first flexible region. In other embodiments, there may plural rigid portions and/or plural flexible portions. For example, in some embodiments, the mixing species may comprise ds-DNA providing the relatively rigid first rigid section, ss-DNA providing the relatively flexible first flexible region and a further ds-DNA moiety/unit providing a relatively rigid (compared to the first flexible region) second rigid section. These may be provided as a single elongate body in a linear chain. The relatively flexibility can be provided by different (e.g. additional) polynucleotide chains, for example where the chains are separated by other components. Use of regions of varying rigidity/flexibility can provide improved mixing and turbulence, due to non-linear movement (e.g. whipping) of the mixing species.

In some embodiments, each mixing species further comprises an actuator element responsive to the force provided by the actuation unit. The actuator element (or amplifying element or moiety) can accordingly provide the mixing species with a functional part which is capable of being influenced by the actuation force, such as an electric or magnetic field. This can either be the only means for interaction with the force in the mixing species (e.g. a magnetic part when the force is a magnetic force) or may be in addition to another means (e.g. the polynucleotide chain). Non-limiting examples include an electro-active element or moiety or a magnetic-active element or moiety. In some embodiments, the actuator element may comprise a metal, such as a metallic bead (such as a magnetic bead).

In some embodiments, each mixing species further comprises a mixing portion or head. A mixing portion or head can be an enlarged portion of the mixing species which aids in mixing due to its size and shape. In some embodiments, these may have a width that is wider than the polynucleotide chain. In embodiments, the mixing head may comprise or be selected from a protein, DNA nanostructures (such as DNA cages, such as those set out in Walsh et. Al ACS Nano 2011, 5, 7, 5427-5432), nanoparticles (such as graphene or carbon nanotubes), inorganic or metallic particles. The mixing structure may be spaced apart from the point at which the mixing species is anchored to the sensor assembly (e.g. the sensing surface and/or the anchor portion) so that it can be moved effectively. This may be separated from these parts by the polynucleotide chain. For example, in some embodiments, each mixing species comprises an anchor portion which anchors the mixing species to the sensor assembly; and wherein the polynucleotide chain connects the actuator element to the anchor portion. This can provide improved mixing due to the flexibility of the polynucleotide chain. In some embodiments, the mixing head may have a largest diameter (i.e. in at least one direction) of at least 25 nm, at least 50 nm, at least 100 nm or at least 200 nm. This may have a maximum largest diameter of 1000 nm.

In some embodiments, the mixing species further comprises a mixing element connected to the polynucleotide chain. Each mixing element may have a largest diameter wider than the largest diameter of the polynucleotide chain. The mixing element is provided on the mixing species along the polynucleotide chain. This may be a mixing head or portion as set out above, in some embodiments. Examples of mixing elements include biomolecules, such as proteins or antibodies, or beads. In one embodiment, the at least one mixing element is selected from the group consisting of an antibody, protein, a bead, and a nanoparticle.

In some embodiments, the mixing species further comprises an additional polymer chain. This may provide a flexible linker, for example in the form of polyethylene glycol (PEG), or it can be used to impart additional rigidity or functionality into the mixing species. For example, this may be a mixing element. For example, the mixing species may comprise a polynucleotide-polymer (e.g. synthetic polymer) chain or polymer-polynucleotide chain. Example polymers include PEG and/or a polyelectrolyte. The additional polymer chain may be in combination with the mixing elements, in some embodiments. For example, this may take the form of polynucleotide-mixing element (e.g. bead)-polyelectrolyte. In some embodiments, the additional polymeric chain is an additional polynucleotide chain. The polymer chain may be connected indirectly or directly to the polynucleotide chain.

In view of the above, it will be appreciated that the mixing species, and in particular the use of a polynucleotide chain, provides a large degree of flexibility and customisability. Exemplary structures include polynucleotide chains provided with an antibody, protein (e.g. serum albumin), bead (e.g. glass, ceramic, polymeric, and/or metallic bead), nanostructures (such as 3D nanostructures), self-assembled DNA structures. Additionally or alternatively, the mixing species may comprise a polymeric (or additional polynucleotide portions) in addition to the polynucleotide chains. Example structures include polynucleotide-bead-polyelectrolyte, polynucleotide-synthetic polymer chain, synthetic polymer-polynucleotide, polynucleotides with biomolecules attached thereto (such as antibodies, protein (e.g. serum albumin) or DNA origami).

The mixing species is intended to mix the fluid provided on the sensing surface, and therefore in some embodiments is not configured to selectively-bind with any target analytes or components within the sample. For example, where the sensor assembly is for detecting a property of an analyte, the mixing species does not selectively bind to the analyte.

In some embodiments, the sensor assembly comprises at least one mixing region having a surface density of mixing species (number/cm$^2$) of from $1 \times 10^{10}$ molecules/cm$^2$ (i.e. individual mixing species/cm$^2$) to $1 \times 10^{14}$ molecules/cm$^2$. In some embodiments, this can be from $1 \times 10^{11}$ molecules/cm$^2$ (i.e. individual mixing species/cm$^2$) to $1 \times 10^{13}$ molecules/cm$^2$, such as from $1 \times 10^{11}$ molecules/cm$^2$ (i.e. individual mixing species/cm$^2$) to $5 \times 10^{12}$ molecules/cm$^2$. This can be an average surface density, such as a mean or number average surface density. Use of a longer species can be used with a lower mixing species density. In some embodiments, the sensor assembly comprises at least one mixing region having 1 mixing species per 200 nm$^2$, such as 1 mixing species per 100 nm$^2$. This can be an average surface density, such as a mean or number average surface density. The or each mixing region may form a part of the sensing surface, or in some embodiments this may be the whole of the sensing surface.

Capture Species

The methods, systems and sensor assemblies disclosed herein can be used to determine or measure a property of a sample, such as the property of an analyte (an analyte characteristic) in a sample. In certain embodiments, this can be selected from the concentration of the analyte in the sample, the diffusion constant of the analyte (e.g. rate of diffusion measured in $m^2/s$) in the sample matrix, or a combination thereof. The terms "analyte concentration" or "concentration of the analyte" as used herein may, in certain embodiments, refer to the activity of the analyte. The activity of the analyte may provide a measure of the effective concentration of the analyte in a sample matrix.

The analyte may, for example, be selected from a molecular species, a metal ion, a virus, and a microorganism. Biomolecule analytes are particularly useful and may, for instance, be a hormone selected from an eicosanoid, a steroid, an amino acid, amine, peptide or protein, a nucleic acid, single or double stranded DNA, peptide nucleic acid.

In some embodiments, the sensor assembly further comprises a capture species for selectively binding to an analyte, wherein the capture species is provided adjacent or on the sensing surface.

Any suitable analyte capture species can be selected, according to the analyte which is intended to be sensed by the sensor assembly. For example, the capture species may comprise an antibody with specificity for a particular antigen. In such an example, the analyte may take the form of the antigen. More generally, the capture species may, in some embodiments, comprise at least one selected from a protein, a peptide, a carbohydrate, a nucleic acid, and an aptamer. The protein may, for example, be an enzyme, such as an enzyme having specificity for the analyte. In other non-limiting examples, the protein is an antibody. In the latter case, the analyte may be an antigen which is specifically bound by the antibody. The capture species may, for instance, comprise or be defined by an antigen. In this case, the analyte may be a species, such as an antibody, which is specifically bound by the antigenic capture species. The antigen may be or comprise, for example, a protein, a peptide, a carbohydrate, such as a polysaccharide or glycan.

The capture species may be located adjacent to or on the sensing surface such that analyte bound to the capture species can interact with the sensing surface and create a measurable response. In some embodiments, the sensing element is functionalized with the capture species. Such functionalization can be achieved in any suitable manner, such as by covalently or non-covalently immobilizing the capture species to the surface. For example, thiol-terminated capture species, such as a thiol-terminated aptamer, can be immobilized, for example grafted, onto the surface of a noble metal, for example gold, electrode.

In some embodiments, the capture species binds to the analyte via a capture moiety and is configured so that this moiety is moveable relative to the sensing element. In this way, the analyte can move relative to the sensing element under the action of a sufficiently strong force (e.g. electric field). This may be as a result of the capture species being a flexible species. For example, the capture species may comprise a first portion bound to a surface of the sensing element and a second portion comprising the capture moiety, the two portions separated by a flexible linker. Flexibility in this regard is sufficient such that a bound analyte can be moved into an adjacent through hole.

In an embodiment, the analyte capture species comprises an aptamer. An aptamer may be defined as an oligonucleotide or peptide configured to bind the analyte. Such an aptamer may, for example, be configured to interact with, for example bind, various analyte types, such as small molecules, for example amino acids or amines, proteins, metal ions, and microorganisms.

Actuation Unit

The actuation unit is configured to move at least a part of each mixing species in a plurality of directions relative to the sensing surface by applying a force or a plurality of different forces to the mixing species. The forces used in the steps disclosed above can be provided by any suitable means of generating a force which acts on the species to move them within the sample matrix on the sensing layer. That is, the actuation unit is configured or arranged relative to the mixing species and sensing surface (e.g. adjacent to or on) so that the force can influence the mixing species which in turn influence the sample on the sensing surface. This may be as a result of a field providing the force, with the field overlapping with the mixing species and with the required intensity or strength or providing sufficient force to create a movement of the mixing species. For example, in some embodiments, this can be through the use of an electric field, magnetic field, or ultrasound energy. In some embodiments, the force is provided by at least one of an electric field or a magnetic field (this may include an electromagnetic field), and may include both. Accordingly, in some embodiments, the actuation unit is configured to generate an electric field or a magnetic field to provide the force to the mixing species. For example, the actuation unit may comprise a plurality of electrodes configured to apply an electric field about the sensing surface. Application of an electric or magnetic field can align the polynucleotide chain with the field and this can be used to move it from an initial position to the aligned position, followed by changing the field which then causes movement to re-align with the new field. This creates the movement. Drag of parts the mixing species during this alignment and subsequent momentum of parts (e.g. relative to the rigid part of the nucleotide chain) after alignment can create a whipping effect which enhances mixing.

By plurality of directions it is meant that the force is applied to move the mixing species in at least two directions (linear vector) under the action of the force. The direction can be in along a vector, such as along an axis in a single direction. In some embodiments, the plurality of directions may comprise moving back and forth under the action of the force in opposing directions along a single axis. In other embodiments, this may be in directions along different axis. In some embodiments, the force may cause the mixing species to rotate about an axis for at least a partial rotation, and in some embodiments a full rotation. The direction can be any direction, but may in embodiments may be a direction that is at an angle of greater than 0 or less than 180 relative to a plane perpendicular to the sensing surface, such as from 15 to 75 degrees. In some embodiments, this may be parallel to or substantially parallel (e.g. within 15 degrees) to the sensing surface. In some embodiments, the number of directions is at least 3. The movement in each direction is under the action of the force.

The force may be directional and accordingly, in some embodiments, the actuation unit may be configured to or be configurable to provide a directional force in plural directions. That is, it is the continued application of force in plural different directions (sequentially, for example) that causes the movement in plural directions, as opposed to a single force in a single direction causing the movement in plural directions. The actuation unit may, in some embodiments, comprise plural force generating elements (e.g. electrodes), each configured to provide a force at a different point and/or providing a directional force in a different direction. This could be an array of different sets of electrodes, each arranged to impart a different electric field. In other embodiments, the actuation unit may be configured to move the field or change the direction of the field, such as having a moveable force generating unit (e.g. set of electrodes) which can be moved so as to change the direction of the force.

In embodiments, the actuation unit may be configured or configurable to cycle the force (e.g. field) between at least two strengths or intensities. In one embodiment, this can be between on and off. In other embodiments, this may be between cycled between at least two values. These can be used to increase turbulence.

It will be appreciated that in any of the embodiments mentioned here, although the resultant force acting on a particular component (e.g. the analyte or non-analyte species) will depend on a number of factors. For example, in the case of an electric field, the charge on the component, the magnitude of the force will be determined by the magnitude of the electric field such that a higher V/m value will lead to a greater force acting on the species in the sample.

In embodiments, the mixing creates a localised mixed region. This is one in which there is movement of species within the sample that is greater than the speed of diffusion, for example. This localised region can be an area or boundary having a maximum distance from the sensing surface (in any direction, for example including height in a direction perpendicular to the sensing surface or distance away from in the plane of the surface) related to the length of the mixing species. In some embodiments, the distance may be up to 20× the length of the capture species, such as up to 10×, such as from 0.1× to 20× the length of the capture species, for example, 0.1× to 10× the length. The length of the mixing species is defined by the longest length of the mixing species as measured from the sensing surface. In some embodiments, the distance may be up to (i.e. less than or equal to) 100 nm, such from 1 nm to 100 nm. A typical Debye length is 1 nm and so modification at this distance can impact the Debye length and screening by the double layer. In some embodiments, the distance may be from 1 nm to 10 nm or 10 nm to 100 nm. The distance may be a single distance, e.g. height or width, both height and width, or all distances from the sensing surface such that the mixing occurs at least one point within this localised region.

In some embodiments, an electric field is used to provide the force for moving the mixing species. That is, the actuation unit is configured to generate an electric field. In embodiments, generation of the electric field can be achieved by applying a voltage across a first electrode and a second electrode located adjacent to or abutting the sensing surface and/or adjacent to and/or surrounding mixing species. The sample (e.g. fluid, such as a solution) can be received between the electrodes. In embodiments, the strength or intensity of the electric field is varied (e.g. by the control unit), for example as measured by the input voltage (V/m or mV/m). For example, the electric field may vary between a minimum and a peak or maximum strength. This can be achieved by varying the voltage across the electrodes used to generate the field, for example, or could be achieved by other means such as moving the relative position of the electrodes. In alternative or additional embodiments, the electric field may be varied between positive and negative input voltages so as to vary the properties of the electric field. In some embodiments, other parameters of the electric field can be varied, such as frequency. Where the means of transducing a signal is based on an electrical signal, the frequency of an electric field used to actuate the mixing species can be different to that used to obtain the signal.

Use of an electric field to cause movement of the mixing species is advantageous because the polynucleotide chain of the mixing species is charged and therefore can easily be manipulated and moved in an electric field. This avoids the need to introduce other elements into the mixing species, such as magnetic elements. Generation of an electric field in such a sensor assembly is also relatively straightforward and amenable to the manufacturing processes used in creating such sensor assemblies (e.g. CMOS semiconductor manufacturing).

In embodiments in which an electric field is generated, the voltage across the first electrode and second electrode generating the electric field may be at least 100 mV, at least 250 mV, at least 750 mV, at least 1V. For example 250 mV to 12 V, such as 250 mV to 5V. In some embodiments, the electric field may have a field strength of at least 0.1V/1 mm, such as at least 0.5V/1 mm, such as at least 1V/1 mm, such as at least 2.5V/1 mm. This can be an electric field strength of from $0.5 \times 10^6$ V/m to $1 \times 10^8$ V/m, such as $1 \times 10^6$ V/m to $2 \times 10^7$ V/m. These can cause movement which is greater than the speed of diffusion. For example, a DNA length of at least 10 nm moves at approximately 5 micrometres/s under a field of 0.5 V/mm. A higher speed will make this faster.

The movement requires a force to be applied to the species. The force applied will depend on the net electric charge of the species it is acting on, for example, as well as other parameters such as fluid properties. However, exemplary forces are at least 1 pN, such as at least 10 pN. This may be from 1 pN to 100 pN, such as 1 pN to 50 pN or 1 pN to 30 pN, for example.

In other embodiments, the actuation unit may be configured to generate a magnetic field. This can be an applied magnetic field, for example generated by an electromagnetic.

The actuation unit (and control unit, where present) is configured together with the mixing species such that the movement of the mixing species under any of the forces set out herein achieves mixing of fluid (e.g. a liquid) on the sensing surface. In some embodiments, the actuation unit and mixing species are configured such that at least a part of the mixing species is moved at a speed of at least 1 μm/s. This can be at least 5 μm/s, or at least 10 μm/s. Fluid movement on the surface may be at a flow rate of at least 1 μm/s. This speed can improve mixing which can aid diffusion and the incubation process. This can be at least 5 μm/s, at least 10 μm/s, or at least 15 μm/s. At these speeds, movement will be faster than diffusion and therefore reduce incubation time.

Sensing Surface

The sensing surface of the sensor assembly can be provided by an addressable or interrogatable component, such as an electrode or field effect transducer (FET). Accordingly, the sensing surface can be a surface of a sensing layer (e.g. an electrode). In some embodiments, this may be formed from or comprise metals, metal oxides, metal nitrides, carbon-based materials, a conductive polymer, doped silicon or polysilicon or combinations thereof. For example, in some embodiments, this may comprise or be formed from copper, nickel, platinum, silver, silver chloride, gold, nickel, titanium, titanium nitride, ruthenium, ruthenium oxide, or combinations thereof. Sensing surfaces, in embodiments, can provide immobilization of capture species through both covalent-like interactions (e.g. chemisorption of anchor species onto the surface through chemical bond formation) and non-covalent-like interactions (e.g. physisorption of capture species onto the surface through weaker, often van der Waals, interactions) depending on the identity of the surface and the capture species. Provision of the capture species to the sensing surface can be achieved through techniques such as spin-coating, physical vapour deposition or electrophoretic deposition. Alternatively, other methods can include immersion of the sensing surface in solution.

In the sensor assembly, methods and systems disclosed herein, the transducer mechanism(s) used to determine the measurement signal may be any suitable method of transduction. For example, this may comprise measuring the potential (e.g. voltage), current, permittivity, charge and/or frequency. Changes in or interactions with the sensing surface (e.g. formed by the capture species on the surface) can be detected through changes in potential. In other embodiments, changes may be determined by monitoring changes in current passing through the sensing surface (at a constant potential).

The sensing surface can be any surface, which may be planar or non-planar, continuous or discontinuous and may include structures such as holes (vias or through holes, grooves), wells, and protrusions.

System

In some embodiments, the sensor assembly (or a system comprising the sensor assembly) further comprises further comprise a control unit configured to cause the actuation unit to move the mixing species in a plurality of directions relative to the sensing surface so as to mix fluid (sample) adjacent or on the sensing surface. In some embodiments, the force is a directional force configured to move each mixing species in a direction; and the control unit is configured to reconfigure the actuation unit so as to change the direction so as to cause the mixing species to move in a plurality of directions.

The system may be configured to perform any of the method steps disclosed herein. Moreover, any of the embodiments set out herein with respect to the method apply equally to the system, and any of the embodiments set out herein with respect to the system apply equally to the method.

The control unit may be provided physically connected to the rest of the sensor assembly (e.g. the actuation unit and sensing surface), for example on the same substrate or connected to these via traces, or it may be a separate component connected, for example, via a wireless connection.

In some embodiments, the control unit may be configured to cause the actuation unit to generate a force for a duration of at least 1 ms, such as at least 5 ms, at least 10 ms, at least 50 ms, at least 100 ms or at least 1 s. This mixing may be carried out for the whole duration of the measurement or may be halted prior to measurement. In some embodiments, the maximum duration may be less than or equal to 30 minutes, such as less than or equal to 5 m, less than or equal to 1 m, less than or equal to 1 s or less than or equal to 100 ms. Exemplary mixing times may include 1 ms to 30 m, such as 1 ms to 1 m, 1 ms to 1 s, 5 ms to 30 m, 10 ms to 30 m, 50 ms to 30 m, 100 ms to 30 m or 1 s to 30 m. In some embodiments, the control unit may be configured to cause the actuation unit to carry out a plurality of mixing steps in which the actuation unit applies a force which switches between a first mixing speed or intensity and a second (different) mixing speed or intensity. In some embodiments, one of the first or second mixing speeds or intensity can be zero (i.e. no mixing) and the other is a non-zero speed or intensity. This may comprise cycling or alternating between mixing speeds and intensities a plurality of times. In some embodiments, the actuation unit may generate a force or forces which cause a part of the mixing species to rotate about an axis or oscillate between at least two points. In some embodiments, the frequency of the rotation or oscillation may be at least $1/50$ ms (i.e. 1 oscillation or rotation per 50 ms), such as at least $1/10$ ms, such as at least $1/5$ ms. This can be a free end of the mixing species, i.e. an end opposite to the point at which the mixing species is anchored to the sensor assembly (e.g. the sensing surface).

In some embodiments, the control unit and/or actuation unit may be configured to actuate all of the mixing species on the sensor assembly to be actuated simultaneously and under the same force and/or the same direction, so that the mixing species move in unison. This can increase the fluid movement.

In some embodiments, the sensor assembly (or a system comprising the sensor assembly) further comprises a property determination unit configured to determine the property of the sample, based on the interaction of the sample with the sensing surface. The sensing surface may provide a measurement signal indicative of a property of the sample, which in some embodiments may be based on the interaction of the sample (e.g. an analyte in the sample) with a capture species. The property determination unit is configured to determine the property (e.g. of the analyte) based on the dielectric of the sensing layer indicated by the measurement signal. In some embodiments, the sensor assembly (or a system comprising the sensor assembly) further comprises a signal processing unit configured to receive and process the measurement signal prior to the property determination unit determining the property based on the processed measurement signal. The property determination unit and/or signal processing unit may be provided physically connected to the rest of the sensor assembly (e.g. the actuation unit and sensing surface), for example on the same substrate or connected to these via traces, or it may be a separate component connected, for example, via a wireless connection.

The control unit, property determination unit and/or signal processing unit may each (individually or combined) be a processor or controller. The control unit may incorporate the property determination unit and/or the signal processing unit or may be in addition to one or both of these. The control unit, signal processing unit, and the property determination unit may be implemented in any suitable manner, with software and/or hardware, to perform the various functions required. One or all of the units may, for example, employ one or more microprocessors programmed using software (for example, microcode) to perform the required functions. Examples of processor components that may be employed in various embodiments include, but are not limited to, conventional microprocessors, application specific integrated circuits (ASICs), and field-programmable gate arrays (FPGAs).

In various implementations, the control unit, the signal processing unit, and/or property determination unit may be associated with one or more non-transitory storage media such as volatile and non-volatile computer memory such as RAM, PROM, EPROM, and EEPROM. The non-transitory storage media may be encoded with one or more programs that, when executed on one or more processors and/or controllers, perform the required functions. Various storage media may be fixed within a processor or controller or may be transportable, such that the one or more programs stored thereon can be loaded into the signal processing unit, property determination unit and/or control unit.

In one aspect, there is provided a computer program comprising computer program code which is configured, when said computer program is run on one or more physical computing devices, to cause said one or more physical computing devices to implement the methods disclosed herein.

In one aspect, there is provided one or more non-transitory computer readable media having a computer program stored thereon, the computer program comprising computer program code which is configured, when said computer program is run on one or more physical computing devices, to cause said one or more physical computing devices to implement the method disclosed herein.

Method

The sensor assembly (e.g. the control unit, actuation unit, property determination unit and/or signal processing unit) may be configured to perform any of the method steps disclosed herein. In embodiments, the control unit and actuation unit of the sensor assembly may be configured to carry out any of the method steps set out herein. Moreover, any of the embodiments set out herein with respect to the method apply equally to the sensor assembly and system, and any of the embodiments set out herein with respect to the sensor assembly system apply equally to the method.

In one aspect, a method of determining a property of sample comprises: providing a sensor assembly comprising a sensing surface for providing a signal indicative of a property of a sample and a plurality of mixing species provided adjacent or on the sensing surface, wherein each mixing species comprises a polynucleotide chain and wherein each mixing species is anchored to the sensor assembly; providing a sample to the sensing surface; moving at least a part of each mixing species in a plurality of directions relative to the sensing surface by applying a force to the mixing species so as to mix sample adjacent to or on the sensing surface; obtaining a measurement signal based on the interaction of the sample with the sensing surface; and determining the property of the sample based on the measurement signal.

As set out above, in embodiments, the method comprises providing a sensor assembly as set out in any of the embodiments disclosed herein. Moreover, the method in embodiments comprises performing any of the steps set out in respect of the control unit, actuation unit, property determination unit and/or signal processing unit (without necessarily requiring the presence of these components). For example, in some embodiments, applying the force comprises applying a magnetic field, electric field or ultrasonic energy. In some embodiments, the force is provided by at least one of an electric field or a magnetic field. This may be as set out for any of the embodiments of the sensor assembly, and the force may have any of the properties set out above. In some embodiments, the force is directional configured to move each mixing species in a direction and the method comprises altering the direction of the force so as to move each mixing species in a plurality of directions relative to the sensing surface. In some embodiments, the mixing species are moved under the force at a speed of at least 1 μm/s.

In some embodiments, the method comprises applying the force for a duration of at least 1 ms, such as at least 5 ms, at least 10 ms, at least 50 ms, at least 100 ms or at least 1 s. This mixing may be carried out for the whole duration of the measurement or may be halted prior to measurement. In some embodiments, the maximum duration may be less than or equal to 30 minutes, such as less than or equal to 5 m, less than or equal to 1 m, less than or equal to 1 s or less than or equal to 100 ms. Exemplary mixing times may include 1 ms to 30 m, such as 1 ms to 1 m, 1 ms to 1 s, 5 ms to 30 m, 10 ms to 30 m, 50 ms to 30 m, 100 ms to 30 m or 1 s to 30 m. In some embodiments, the mixing may comprise switching between a first mixing speed or intensity and a second (different) mixing speed or intensity. In some embodiments, one of the first or second mixing speeds or intensity can be zero (i.e. no mixing) and the other is a non-zero speed or intensity. The method may comprise cycling or alternating between mixing speeds and intensities a plurality of times.

In one embodiment, the force acts on the mixing species so as to cause a part of the mixing species to rotate about an axis or oscillate between at least two points. In some embodiments, the frequency of the rotation or oscillation may be at least 1/50 ms (i.e. 1 oscillation or rotation per 50 ms), such as at least 1/10 ms, such as at least 1/5 ms. This can be a free end of the mixing species, i.e. an end opposite to the point at which the mixing species is anchored to the sensor assembly (e.g. the sensing surface).

Figure 1:
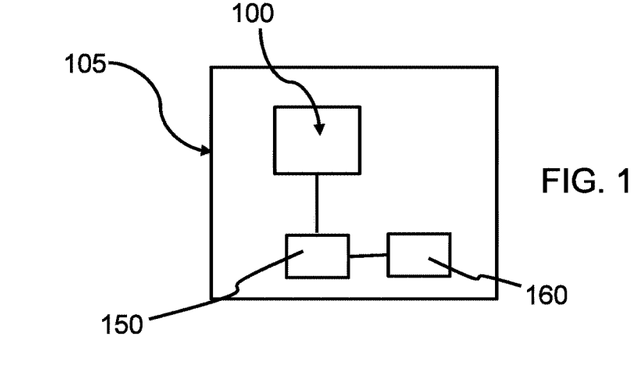
FIG. 1 provides a schematic plan view of a system according to an embodiment.
Figure 2A:
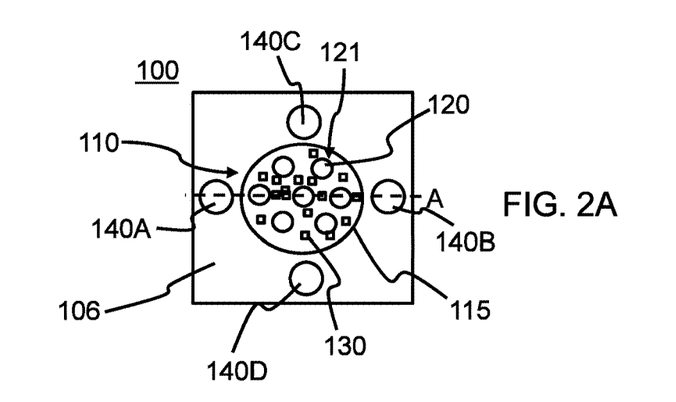
FIG. 2A provides a schematic plan view of a sensor assembly according to an embodiment.
Figure 2B:
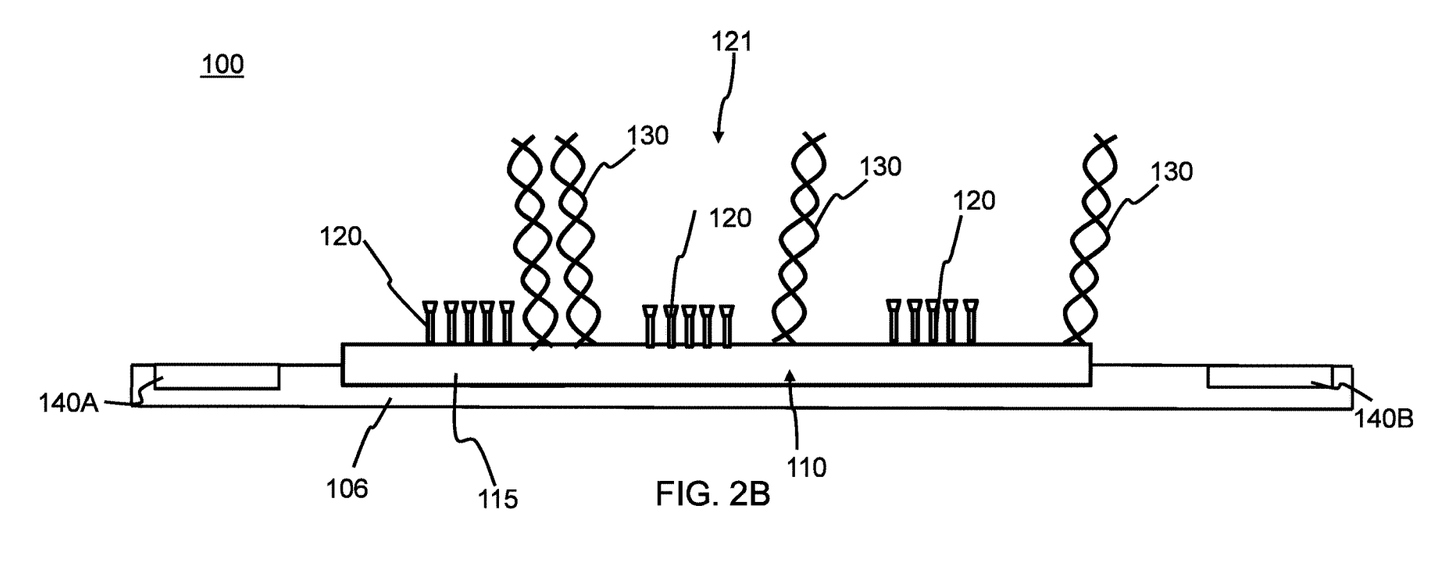
FIG. 2B provides a schematic cross-sectional view of the sensor assembly of FIG. 2A.
Figure 3A:
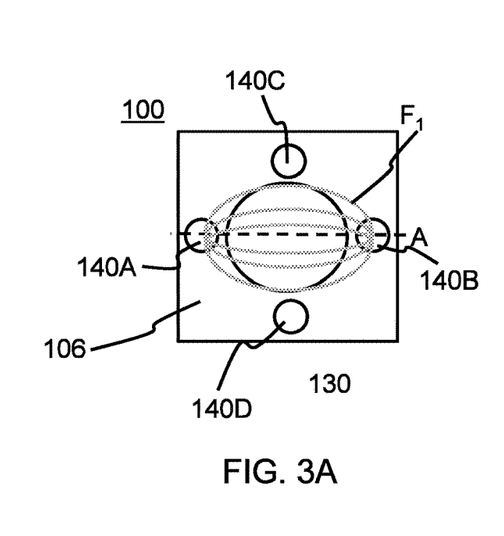
FIGS. 3A and 3B provide schematic plan views of the sensor assembly of FIG. 2A.
Figure 3B:
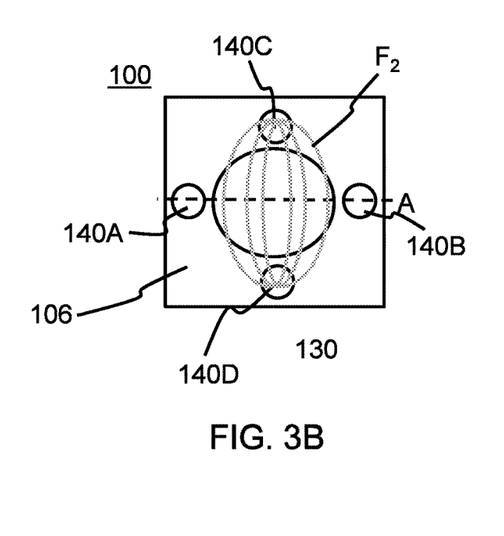

FIG. 1 schematically depicts a system 105 for determining the concentration of a target analyte according to an embodiment and FIGS. 2A and 2B schematically depict an embodiment of a sensor assembly 100 used in the system 105 of FIG. 1. FIG. 2A shows a schematic plan view of the sensor assembly 100. FIG. 2B shows a schematic cross-sectional view of the sensor assembly 100 through line A of FIG. 2A.

The system 105 comprises the sensor assembly 100, a signal processing unit 150 and a processor which acts as a control unit 160 for controlling operation of the components of the system and which is used to determine the concentration of the target analyte in the sample.

The sensor assembly 100 comprises a substrate 106 on which is provided a sensing element 110 formed of a sensing layer 115. The sensing layer 115 comprises an individually addressable electrode and is functionalised with capture species 120 which are specific to the target analyte such that the capture species 120 will selectively bind with the target analyte in the sample. The capture species 120 are provided on the upper surface of the sensing layer 115, and together with the upper surface form a sensing surface 121. The sensing layer 115 can be addressed to provide first measurement signal indicative of the interaction of the sensing surface 121 with the target analyte, which measurement signal is initially processed by the signal processing unit 150.

The sensor assembly 100 further comprises a plurality of mixing species 130 provided on the sensing surface 121. In other words, the sensing layer 115 is further functionalised with mixing species 130. In the depiction shown in FIGS. 2A and 2B, the sensing layer 115 is arranged with intermixed discrete regions of capture species 120 and mixing species 130. The sensing surface 121 thus comprises discrete regions of capture species 120 surrounded by mixing species (singular or plural) in discrete regions. It will be appreciated, however, that the relative configuration may vary. For example, it may be that one species would cover all of the sensing layer 115 not covered by the other of the species. It will also be appreciated, however, that the depictions in FIGS. 2A and 2B are schematic and that the sizes of the capture species 120 and mixing species 130, relative to one another and the other components of the sensor assembly 100 are schematic. As such, it will be expected that the density of capture species 120 and mixing species 130 in these discrete regions will be higher, such as orders of magnitude higher than that schematically depicted.

The mixing species 130 in this embodiment are formed of ds-DNA. One end of the ds-DNA chain is bound to the sensing layer 115 and the opposite end is unbound and free to move relative to the sensing layer 115. Ds-DNA is a particularly effective mixing means. The mechanical features of the structure of ds-DNA is advantageously rigid but while still retaining some flexibility (i.e. they are not stiff). This means that, rather than simply moving as a rigid rotor, they instead create a whipping or thrashing motion which can increase turbulence and therefore the mixing effect. Moreover, ds-DNA is strongly electrostatically charged making it relatively easy to manipulate this using an electric field and incorporate this into a traditional sensor assembly package and manufacturing process.

The length of the ds-DNA mixing species 130 in this embodiment is greater than the length of the capture species, and in this embodiment is at least 3 times the length of the capture species.

The sensor assembly 100 further comprises an actuation unit formed of four cylindrical electrodes 140A-140D equally spaced around the circumference of the sensing surface (see FIG. 2A). Each of the four cylindrical electrodes 140A-140D is provided on the substrate 106 and stood upright with its elongated length along the cylindrical length extending perpendicular to the substrate 106 and thus the sensing layer 115 and sensing surface 121. Each of the four cylindrical electrodes 140A-140D can be individually operated. The four cylindrical electrodes 140A-140D are configured so as to act in pairs to generate an electric field therebetween, which electric field acts on the mixing species 130 and causes the mixing species to align with the electric field and thus move. The actuation unit, and the control unit 160 which controls the actuation of the four cylindrical electrodes 140A-140D are configured so that various combinations of the electrodes can act as electrode pairs and generate an electric field therebetween, which creates electric fields of different orientations and different directions. This in turn causes the mixing species 130 (and particularly the unbound end of the mixing species 130) to move at least a part of each mixing species in a plurality of directions relative to the sensing surface by applying a force to the mixing species 130 so as to mix sample adjacent to or on the sensing surface. The speed, intensity and direction is chosen to create rapid movement of the mixing species 130 and in turn create local mixing of solution on the sensing surface 121.

Although the electrodes 140A-140D are shown as cylindrical electrodes of a particular height, it will be appreciated, however, that the sensor assembly is not limited to a particular shape or height and that any suitable shape or height can be used.

Although the mixing species 130 and capture species 120 are shown as being provided in discrete regions, it will be appreciated that in other embodiments these may be intermixed so that the mixing species 130 are dispersed amongst the capture species 120.

Operation of the sensor assembly 100 and system 105 is described below with reference to FIGS. 3A and 3B and FIGS. 4A and 4B. In use, one embodiment of the use of the system 105 comprises providing a sample with an unknown concentration of the target analyte to the sensor assembly 100. To promote binding of target analyte to the capture species 120, the sample can be mixed in the local region about the sensing surface 121. Such mixing can increase movement of analyte through the solution (greater than diffusion alone), remove non-specifically bound components and disrupt the build up of any electric double layer on the surface.

Figure 4A:
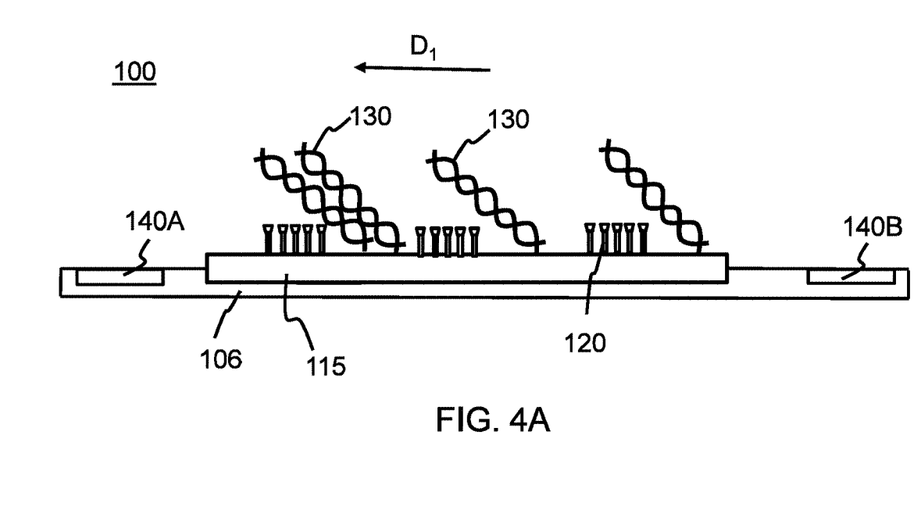
FIGS. 4A and 4B provide a schematic cross-sectional view of the sensor assembly of FIG. 2A.

In a first step, two of the four cylindrical electrodes 140A-140D can be operated as a first pair. In one example, this can be a first electrode 140A and an opposing second electrode 140B on the opposite side of the sensing surface 121. By actuating the first electrode 140A and second electrode 140B with a sufficient voltage, an electric field is created over the sensing surface 121 as schematically depicted by electrical field lines $F_1$ in FIG. 3A. In this case, the direction of the field is from the second electrode 140B to the first electrode 140A. This electric field causes deflection or movement of the mixing species towards the first electrode 140A (i.e. in a first direction $D_1$), as depicted in FIG. 4A. Movement of the mixing species 130 (e.g. from an approximately upright position as shown in FIG. 2B) to the position depicted in FIG. 4A in which the mixing species 130 is acted on by the electric field causes motion of the fluid. This is amplified by the structure of the polynucleotide chain, in this case DNA. Specifically, the flexibility of the ds-DNA chain creates a whipping motion as some of the mixing species 130 flexes. This means that parts of the ds-DNA chain move at different rates and stop at different rates. In some cases, some may act as a whip and extend beyond the alignment position due to momentum, before returning to the aligned position. Thus, the chain creates an effect which is beyond simply a rigid rotor moving in the direction of the electric field.

Figure 4B:
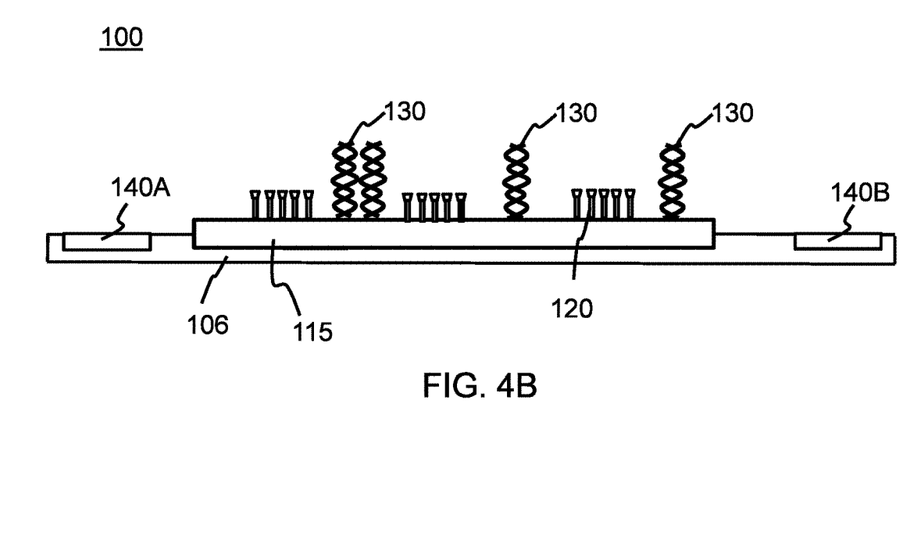

In a second step, a further two of the four cylindrical electrodes 140A-140D can be operated as a second pair. In one example, this can be a third electrode 140C and an opposing fourth electrode 140D on the opposite side of the sensing surface 121. These are offset relative to the first electrode 140A and second electrode 140B by 90 degrees. Actuation of the third electrode 140C and fourth electrode 140D with a sufficient voltage therefore creates an electric field over the sensing surface 121 which is perpendicular to the electric field created by the pair formed by the first electrode 140A and second electrode 140B. This field is schematically depicted by electrical field lines $F_2$ in FIG. 3B. In this case, the direction of the field is from the third electrode 140C to the fourth electrode 140D. This electric field causes deflection or movement of the mixing species towards the fourth electrode 140D (i.e. in a second direction), as depicted in FIG. 4B, where the mixing species as deflected in a plane perpendicular to the cross-section A. Moreover, if the mixing species 130 has not returned to the upright rest position of FIG. 2B, the movement from a position such as that in FIG. 4B can also create even more turbulence or flow due to the pivoting and non-linear motion caused by movement about the point at which the ds-DNA is anchored to the surface. In some embodiments, this can be used to impart a rotary-type motion about each ds-DNA anchor portion. Movement caused by the second pair thus causes movement in a second direction creating non-linear movement of the fluid sample and creating turbulence in plural directions.

The system 105 may use any combination of the four cylindrical electrodes 140A-140D and any operation to impart the movement under the force in plural directions and thereby provide mixing. This may comprise a continuous mixing effect by switching between the two mixing configurations detailed above and/or by cycling between these and other mixing configurations. For example, any combination of at least two of the four cylindrical electrodes 140A-140D could be used to impart a particular force and direction on the mixing species 130 and by switching between different combinations of pairs of the four cylindrical electrodes 140A-140D.

After or during this stage, the control unit 160 can determine the property of the analyte in the sample solution by obtaining the measurement signal (via the signal processing unit 150). In this embodiment, the measurement signal is used to determine the concentration of the analyte in the sample, which is as a result of the specific binding of analyte to the capture species 120. In this embodiment, the measurement process is sped up by the mixing species 130 increasing transport of analyte to the sensing surface 121, where it is bound to the capture species 120, and removal of non-bound and non-specifically bound species from the sensing surface 121 through the mixing action.

In one exemplary embodiment, any two electrodes from the four cylindrical electrodes 140A-140D opposite one another (i.e. across the diameter of the sensing surface 121) are spaced apart by a distance of less than 100 micrometres, such as less than 25 micrometres. The voltage applied was less than or equal to 5V to generate movement of the mixing species 130. In some embodiments, AC with frequencies of up to 1 MHz can be used.

Figure 5A:
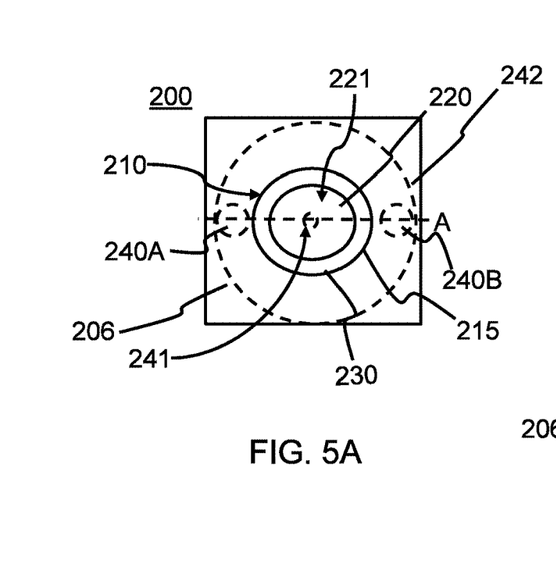
FIG. 5A provides a schematic plan view of a sensor assembly according to an embodiment.
Figure 5B:
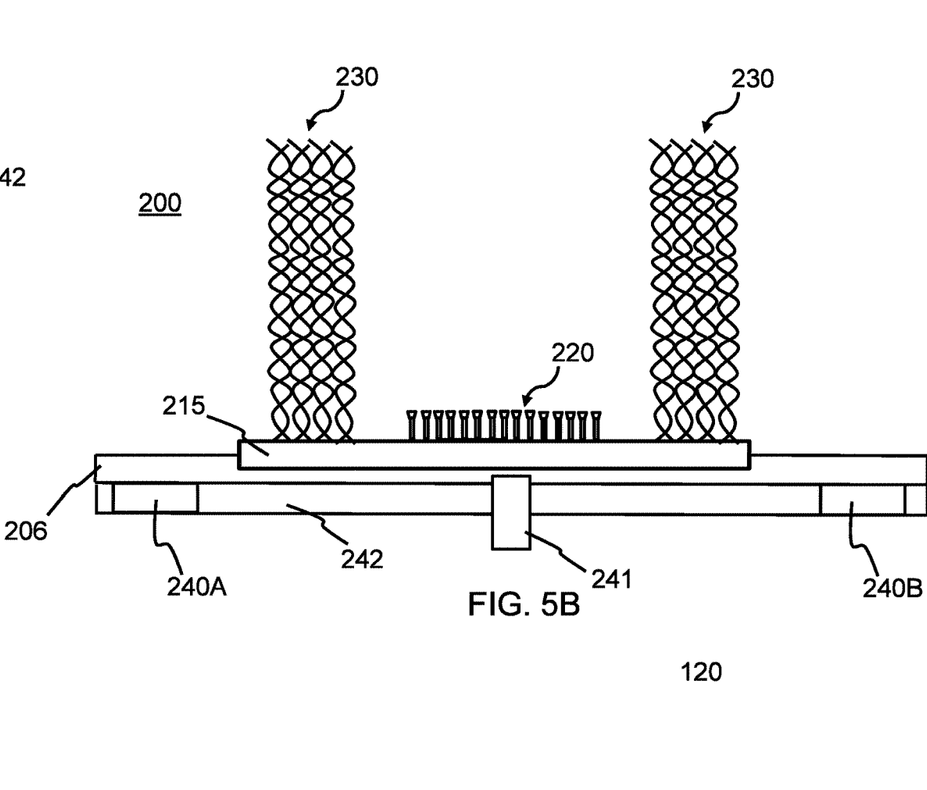
FIG. 5B provides a schematic cross-sectional view of the sensor assembly of FIG. 5A.

FIGS. 5A and 5B depict a second embodiment of a sensor assembly 200 for determining a property of an analyte in a sample. FIG. 5A provides a schematic plan view of the sensor assembly 200. FIG. 5B shows a schematic cross-sectional view of the sensor assembly 100 through line A of FIG. 5A.

The sensor assembly 200 comprises a substrate 206 on which is provided a sensing element 210 formed of a sensing layer 215. The sensing layer 215 comprises an individually addressable electrode and is functionalised with capture species 220 which selectively bind with the target analyte. The capture species 220 are provided on the upper surface of the sensing layer 215, and together with the upper surface form a sensing surface 221. The sensing layer 215 can be addressed to provide first measurement signal indicative of the interaction of the sensing surface 221 with the target analyte.

The sensor assembly 200 further comprises a plurality of mixing species 230 provided on the sensing surface 221. As depicted in FIGS. 5A and 5B, the sensing layer 215 in this embodiment is arranged with a single discrete circular region functionalised with the capture species 220 which is surrounded by a concentric circular region of mixing species 230. The mixing species 230 in this embodiment are formed of ds-DNA with a length of about 5× the length of the capture species 220. One end of the ds-DNA chain is bound to the sensing layer 215 and the opposite end is unbound and free to move relative to the sensing layer 215.

The sensor assembly 200 further comprises an actuation unit formed of a rotatable disc 242 located on the underside of the substrate 206, a pivot 241 about which the rotatable disc 242 is rotatable and which is coaxial with the central axis of the circular region comprising the capture species 220, a first electrode 240A and a second electrode 240B. The first electrode 240A is located, from a plan view, on one side of the sensor assembly 200 adjacent the region comprising the mixing species 230 and the second electrode 240B on the opposite side of the sensor assembly 200, adjacent the opposite side of the region comprising the mixing species 230. The first and second electrodes 240A, 240B are arranged in the rotatable disc 242 and rotated with the disc about the pivot 241. In this embodiment, rotation of the rotatable disc 242, and according the rotation of the first and second electrodes 240A, 240B. The first and second electrodes 240A, 240B acts as a pair of electrodes to generate an electric field therebetween which imparts a force acting in a first direction on the mixing species 230 so as to move these in a first direction. The provision of a force which acts in plural directions is achieved by the rotatable disc 242, which enables the first and second electrodes 240A, 240B to take any position about the circumference of the region comprising the mixing species 230 under the action of the control unit. This movement of the first and second electrodes 240A, 240B results in an electric field with a different direction, and thus provides a force which acts on the mixing species 230 in a different direction. The speed, intensity and direction is chosen to create rapid movement of the mixing species 230 and in turn create local mixing of solution on the sensing surface 221.

Operation of the sensor assembly 200 generally is similar to that of the sensor assembly 100, with the provision of the force instead dependent on the position of the first and second electrodes 240A, 240B and controlled by the rotation of the rotatable disc 242. Movement of the rotatable disc 242 in can be continuous or it may be rotated to fixed positions.

Although in the above embodiments, the mixing species 130, 230 are formed of ds-DNA, other mixing species can advantageously provide the turbulent motion required for mixing. Exemplary mixing species 320, 420, 520, 620 are depicted in the schematic cross-sectional views shown in FIGS. 6A-6C and 7A-7B.

Figure 6A:
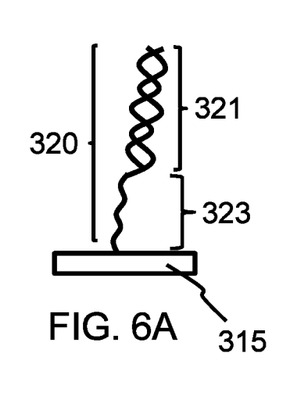
FIGS. 6A to 6C provides schematic views of mixing species.
Figure 6B:
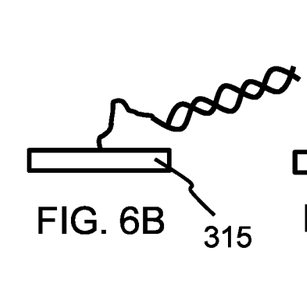
Figure 6C:
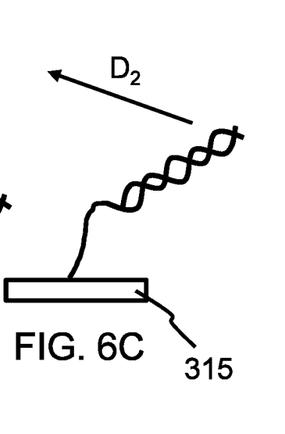

FIGS. 6A-6C schematically depict a mixing species 320 comprising a polynucleotide chain formed of a ss-DNA portion 323 which at one end is bound to a sensing layer 315 and a ds-DNA portion 321 which is bound to free end of ss-DNA portion 323. Ss-DNA is significantly more flexible than ds-DNA and therefore provides a highly deformable and flexible region, enabling increased movement of the remainder of the mixing species 320 (i.e. the ds-DNA portion 321) relative to the sensing layer 315, and which also has the other benefits of a polynucleotide chain. The ds-DNA portion 321 provides the more rigid (yet still flexible region). Together these can combine to provide the whipping motion which produces turbulence in fluid on the sensing layer 315. For example, as depicted in FIGS. 6B and 6C, the ss-DNA portion 323 tends to deform first and when acted on by a force with direction $D_2$, this leads to relatively free movement of the ds-DNA portion 321 creating a whipping or flailing motion. In other, similar embodiments, the ss-DNA portion could be replaced by a polymeric chain to provide the additional flexibility, for example polyethylene glycol (PEG).

Figure 7A:
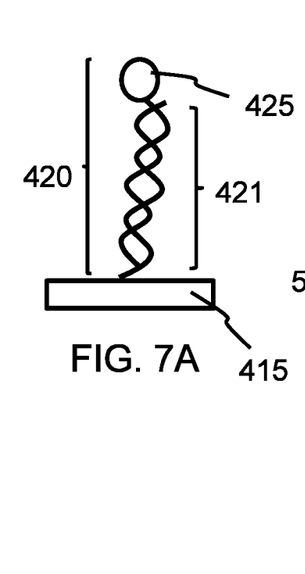
FIGS. 7A to 7C provides schematic views of mixing species.

FIG. 7A schematically depicts a mixing species 420 comprising a polynucleotide chain in the form of ds-DNA 421 which is bound to a sensing layer 415 at a first end. The mixing species 420 also comprises an actuator element 425 at the second end of the ds-DNA 421. The actuator element 425 can be an electrically conductive bead and in some embodiments can be a magnetic bead. In the case of a conductive bead, this can increase the response of the mixing species 420 to an electrical field. In the case of a magnetic bead, this enables manipulation and mixing using a magnetic field, which can be used instead of or in addition to an electrical field to actuate the mixing species 420.

Figure 7B:
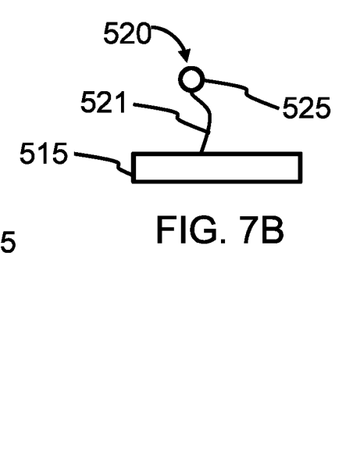

FIG. 7B schematically depicts a mixing species 520 comprising a polynucleotide chain in the form of ss-DNA 521 which is bound to a sensing layer 515 at a first end. The mixing species 520 also comprises a mixing head 525 at the second end of the ss-DNA 521. The mixing head 525 has a diameter significantly larger than the width of the polynucleotide chain and accordingly can be used to amplify mixing caused by the mixing species 420.

Figure 7C:
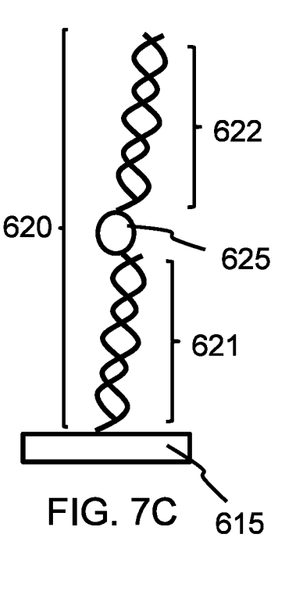

FIG. 7C schematically depicts a mixing species 620 comprising two polynucleotide chains in the form of a first length of ds-DNA 621, which is bound to a sensing layer 415 at a first end, and a second length of ds-DNA 622 at the other end of the mixing species 620. The mixing species 620 also comprises an actuator element 625 at the second end of the first length of ds-DNA 421. The second length of ds-DNA 622 is bound to the actuator element 625. The actuator element 625 can be an electrically conductive bead and in some embodiments can be a magnetic bead. In other embodiments, rather than an actuator element 625, this can instead be an antibody or other biomolecule, for example.

Figure 8:
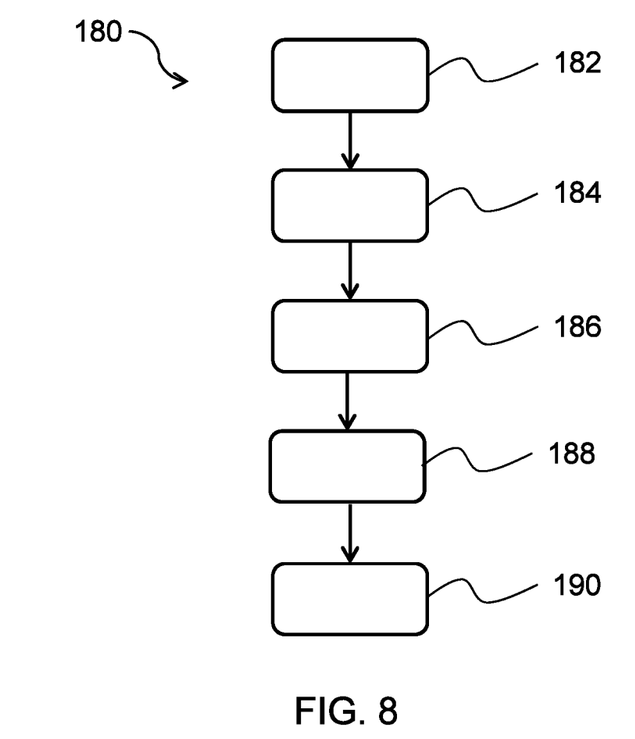
FIG. 8 provides a block diagram of a method according to an embodiment.

FIG. 8 schematically depicts a method 180 of determining a property of sample according to an embodiment. The method comprises:
 providing a sensor assembly 182 comprising a sensing surface for providing a signal indicative of a property of a sample and a plurality of mixing species provided adjacent or on the sensing surface, wherein each mixing species comprises a polynucleotide chain and wherein each mixing species is anchored to the sensor assembly;
 providing a sample to the sensing surface 184;
 moving at least a part of each mixing species in a plurality of directions relative to the sensing surface 186 by applying a force to the mixing species so as to mix sample adjacent to or on the sensing surface;
 obtaining a measurement signal 188 based on the interaction of the sample with the sensing surface; and
 determining the property of the sample based on the measurement signal 190.

Although in the above embodiments, discrete regions of capture species and mixing species have been provided on the sensor layers, it will be appreciated that these could be in any configuration which leads to mixing. For example, in some embodiments, these may be intermixed on a molecular (e.g. nanoscale). For example, mixing species may be interspersed between capture species. In other embodiments, these may be separated into discrete regions.

It should be understood that the detailed description and specific examples, while indicating exemplary embodiments of the apparatus, systems and methods, are intended for purposes of illustration only and are not intended to limit the scope. These and other features, aspects, and advantages of the apparatus, systems and methods of the present invention can be better understood from the description, appended claims or aspects, and accompanying drawings. It should be understood that the Figures are merely schematic and are not drawn to scale. It should also be understood that the same reference numerals are used throughout the figures to indicate the same or similar parts.

Other variations to the disclosed embodiments can be understood and effected by those skilled in the art in practicing the disclosure, from a study of the drawings, the disclosure, and the appended aspects or claims. In the aspects or claims, the word "comprising" does not exclude other elements or steps, and the indefinite article "a" or "an" does not exclude a plurality. The mere fact that certain measures are recited in mutually different dependent aspects or claims does not indicate that a combination of these measures cannot be used to advantage. Any reference signs in the claims should not be construed as limiting the scope.

Aspects of the invention will now be described:

In a first aspect, there is a sensor assembly for determining a property of a sample, the sensor assembly comprising:
 a sensing surface for providing a signal indicative of a property of a sample;
 a plurality of mixing species provided adjacent or on the sensing surface, wherein each mixing species comprises a polynucleotide chain and wherein each mixing species is anchored to the sensor assembly; and
 an actuation unit configured to move at least a part of each mixing species in a plurality of directions relative to the sensing surface by applying a force to the mixing species so as to mix sample adjacent to or on the sensing surface.

In a second aspect, there is a sensor assembly according to the first aspect, wherein the polynucleotide chain comprises at least one of deoxyribonucleic acid (DNA), or ribonucleic acid (RNA).

In a third aspect, there is a sensor assembly according to the second aspect, wherein the polynucleotide chain comprises at least one of single-stranded DNA (ss-DNA) or double-stranded DNA (ds-DNA).

In a fourth aspect, there is a sensor assembly according to any preceding aspect, wherein the polynucleotide chain comprises ds-DNA having a length of at least 20 base pairs.

In a fifth aspect, there is a sensor assembly according to the fourth aspect, wherein the polynucleotide chain comprises ds-DNA having a length of from 20 base pairs to 900 base pairs.

In a sixth aspect, there is a sensor assembly according to any preceding aspect, wherein the polynucleotide chain has a length of from 10 nm to 1000 nm.

In a seventh aspect, there is a sensor assembly according to any preceding aspect, wherein the mixing species has a length of from 15 nm to 1000 nm.

In an eighth aspect, there is a sensor assembly according to any preceding aspect, wherein each mixing species is anchored to the sensing surface.

In a ninth aspect, there is a sensor assembly according to any preceding aspect, wherein each mixing species comprises an elongate body, the elongate body comprising the polynucleotide chain; and wherein the elongate body comprises a first flexible region and a first rigid region, the first rigid region having a flexibility less than the first flexible region.

In a tenth aspect, there is a sensor assembly according to any preceding aspect, wherein each mixing species further comprises an actuator element responsive to the force provided by the actuation unit.

In an eleventh aspect, there is a sensor assembly according to the tenth aspect, wherein each mixing species comprises an anchor portion which anchors the mixing species to the sensor assembly; and wherein the polynucleotide chain connects the actuator element to the anchor portion.

In a twelfth aspect, there is a sensor assembly according to any preceding aspect, further comprising a capture species for selectively binding to an analyte, wherein the capture species is provided adjacent or on the sensing surface.

In a thirteenth aspect, there is a sensor assembly according to any preceding aspect, wherein the actuation unit is configured to generate an electric field or a magnetic field to provide the force to the mixing species.

In a fourteenth aspect, there is a sensor assembly according to any preceding aspect, further comprising a control unit configured to cause the actuation unit to move the mixing species in a plurality of directions relative to the sensing surface so as to mix fluid adjacent the sensing surface.

In a fifteenth aspect, there is a sensor assembly according to the fourteenth aspect, wherein the force is a directional force configured to move each mixing species in a direction; and wherein the control unit is configured to reconfigure the actuation unit so as to change the direction so as to cause the mixing species to move in a plurality of directions.

In a sixteenth aspect, there is a sensor assembly according to any preceding aspect, wherein the actuation unit and mixing species are configured such that at least a part of the mixing species is moved at a speed of at least 1 µm/s.

In a seventeenth aspect, there is a sensor assembly according to any preceding aspect, wherein the mixing species further comprises a mixing element connected to the polynucleotide chain, optionally wherein the mixing element is selected from the group consisting of an antibody, protein, a bead, or a nanoparticle.

In an eighteenth aspect, there is a sensor assembly according to any preceding aspect, wherein the mixing species further comprises a polymer chain.

In a nineteenth aspect, a sensor assembly for determining a property of a sample comprises:
- a sensing surface for providing a signal indicative of a property of a sample;
- a plurality of mixing species provided adjacent or on the sensing surface, wherein each mixing species comprises a polynucleotide chain, wherein each mixing species is anchored to the sensor assembly, wherein the polynucleotide chain comprises DNA and wherein the mixing species has a length of at least 10 nm; and
- an actuation unit configured to move at least a part of each mixing species relative to the sensing surface by applying a force to the mixing species so as to mix sample adjacent to or on the sensing surface.

In a twentieth aspect, there is provided a method of determining a property of sample, the method comprising:
- providing a sensor assembly comprising a sensing surface for providing a signal indicative of a property of a sample and a plurality of mixing species provided adjacent or on the sensing surface, wherein each mixing species comprises a polynucleotide chain and wherein each mixing species is anchored to the sensor assembly;
- providing a sample to the sensing surface;
- moving at least a part of each mixing species in a plurality of directions relative to the sensing surface by applying a force to the mixing species so as to mix sample adjacent to or on the sensing surface;
- obtaining a measurement signal based on the interaction of the sample with the sensing surface; and
- determining the property of the sample based on the measurement signal.

In a twenty first aspect, there is the method of the twentieth aspect, wherein the force is provided by at least one of an electric field or a magnetic field.

In a twenty second aspect, there is the method of the twentieth aspect or the twenty first aspect, wherein the force is directional configured to move each mixing species in a direction and the method comprises altering the direction of the force so as to move each mixing species in a plurality of directions relative to the sensing surface.

In a twenty third aspect, there is the method of the twentieth aspect, the twenty first aspect or the twenty second aspect, wherein the mixing species are moved under the force at a speed of at least 1 µm/s.

The invention claimed is:

1. A sensor assembly for determining a property of a sample, the sensor assembly comprising:
- a sensing surface for providing a signal indicative of the property of the sample;
- a plurality of mixing species provided adjacent or on the sensing surface, wherein each mixing species comprises a polynucleotide chain and wherein each mixing species is anchored to the sensor assembly and configured to mix the sample adjacent or on the sensing surface and not configured to selectively bind to analyte in the sample; and
- an actuation unit having a force-generating element for providing a force sufficient to move at least a part of each mixing species in a plurality of directions relative to the sensing surface by applying the force to each mixing species so as to mix the sample adjacent to or on the sensing surface, wherein the force is provided by an electric field, a magnetic field, ultrasound energy, or a combination thereof.

2. The sensor assembly of claim 1, wherein the polynucleotide chain comprises at least one of deoxyribonucleic acid (DNA), or ribonucleic acid (RNA).

3. The sensor assembly of claim 2, wherein the polynucleotide chain comprises at least one of single-stranded DNA (ss-DNA) or double-stranded DNA (ds-DNA).

4. The sensor assembly of claim 1, wherein the polynucleotide chain comprises ds-DNA having a length of at least 20 base pairs.

5. The sensor assembly of claim 4, wherein the polynucleotide chain comprises ds-DNA having a length of from 20 base pairs to 900 base pairs.

6. The sensor assembly of claim 1, wherein the polynucleotide chain has a length of from 10 nm to 1000 nm.

7. The sensor assembly of claim 1, wherein each mixing species is anchored to the sensing surface.

8. The sensor assembly of claim 1, wherein each mixing species comprises an elongate body, the elongate body comprising the polynucleotide chain; and wherein the elongate body comprises a first flexible region and a first rigid region, the first rigid region having a flexibility less than the first flexible region.

9. The sensor assembly of claim 1, wherein each mixing species further comprises an actuator element, the actuator element comprising a material that is responsive to the force provided by the force-generating element.

10. The sensor assembly of claim 9, wherein each mixing species comprises an anchor portion which anchors each mixing species to the sensor assembly; and wherein the polynucleotide chain connects the actuator element to the anchor portion.

11. The sensor assembly of claim 1, further comprising a capture species for selectively binding to an analyte, wherein the capture species is provided adjacent or on the sensing surface.

12. The sensor assembly of claim 1, wherein the actuation unit is configured to generate an electric field or a magnetic field to provide the force to the plurality of mixing species.

13. The sensor assembly of claim 1, further comprising a control unit configured to cause the actuation unit to move each mixing species in the plurality of directions relative to the sensing surface so as to mix the sample adjacent the sensing surface.

14. The sensor assembly of claim 13, wherein the force is a directional force configured to move each mixing species in a direction; and wherein the control unit is configured to reconfigure the actuation unit so as to change the direction so as to cause the plurality of mixing species to move in a plurality of directions.

15. The sensor assembly of claim 1, wherein the actuation unit and each mixing species are configured such that at least the part of each mixing species is moved at a speed of at least 1 µm/s.

16. The sensor assembly of claim 1, wherein each mixing species further comprises a mixing element connected to the polynucleotide chain, optionally wherein the mixing element is selected from the group consisting of an antibody, a protein, a bead, or a nanoparticle.

17. The sensor assembly of claim 1, wherein each mixing species further comprises a polymer chain.

18. A sensor assembly for determining a property of a sample, the sensor assembly comprising:
   a sensing surface for providing a signal indicative of the property of the sample;
   a plurality of mixing species provided adjacent or on the sensing surface, wherein each mixing species comprises a polynucleotide chain, wherein each mixing species is anchored to the sensor assembly and configured to mix the sample adjacent or on the sensing surface and not configured to selectively bind to analyte in the sample, wherein the polynucleotide chain comprises DNA and wherein each mixing species has a length of at least 10 nm; and
   an actuation unit configured to move at least a part of each mixing species relative to the sensing surface by applying a force to each mixing species so as to mix the sample adjacent to or on the sensing surface.

19. A method of determining a property of a sample, the method comprising:
   providing the sensor assembly of claim 1;
   providing the sample to the sensing surface;
   moving at least a part of each mixing species in the plurality of directions relative to the sensing surface by applying the force to each mixing species so as to mix sample adjacent to or on the sensing surface;
   obtaining a measurement signal based on an interaction of the sample with the sensing surface; and
   determining the property of the sample based on the measurement signal.

20. The method of claim 19, wherein the force is provided by at least one of an electric field or a magnetic field.

21. The method of claim 19, wherein the force is directional configured to move each mixing species in a direction and the method comprises altering the direction of the force so as to move each mixing species in the plurality of directions relative to the sensing surface.

22. The method of claim 19, wherein the mixing species are moved under the force at a speed of at least 1 μm/s.

* * * * *